United States Patent
Belschner et al.

(10) Patent No.: US 12,058,611 B2
(45) Date of Patent: Aug. 6, 2024

(54) NETWORK SLICING BASED CAMPUS NETWORKS

(71) Applicant: Deutsche Telekom AG, Bonn (DE)

(72) Inventors: Jakob Belschner, Frankfurt am Main (DE); Josep Colom Ikuno, Korneuburg (AT); Stefanus Roemer, Hennef (DE); Sacha Gastel, Kreuzau (DE); Vasil Aleksiev, Vienna (AT); Piotr Karas, Warsaw (PL)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/063,712

(22) Filed: Dec. 9, 2022

(65) Prior Publication Data
US 2023/0189133 A1    Jun. 15, 2023

(30) Foreign Application Priority Data
Dec. 10, 2021 (EP) .................................. 21213695

(51) Int. Cl.
*H04W 48/18* (2009.01)
*H04W 84/04* (2009.01)
(52) U.S. Cl.
CPC .......... *H04W 48/18* (2013.01); *H04W 84/042* (2013.01)
(58) Field of Classification Search
CPC ............................. H04W 48/18; H04W 84/042
See application file for complete search history.

(56) References Cited

U.S. PATENT DOCUMENTS

| 10,785,652 | B1* | 9/2020 | Ravindranath | ........ H04W 12/48 |
| 2020/0008047 | A1* | 1/2020 | Castellanos Zamora | ..................... H04W 8/20 |
| 2020/0235952 | A1* | 7/2020 | Mukherjee | .......... H04L 41/5019 |
| 2020/0259896 | A1* | 8/2020 | Sachs | ..................... H04J 3/0667 |
| 2021/0045193 | A1 | 2/2021 | Mishra et al. | |
| 2021/0058784 | A1* | 2/2021 | Kedalagudde | ........ H04W 48/18 |

(Continued)

OTHER PUBLICATIONS

GSMA V1: "GSM Association Non-confidential Official Document NG.123-5G industry campus network deployment guideline", Nov. 10, 2020, XP055921304, Retrieved from the Internet: URL:https://www.gsma.com/newsroom/wpcontent/uploads//NG.123-v1.0-3.pdf [retrieved on May 16, 2022].

*Primary Examiner* — Ernest G Tacsik
(74) *Attorney, Agent, or Firm* — Leydig, Voit & Mayer, Ltd.

(57) ABSTRACT

A 5G network includes an access network (AN), a 5G Core (5GC), one or more campus network components each configured to run 5GC software associated to a campus network, and one or more public network components each configured to run 5GC software associated to a public network. The 5GC comprises a central cloud having functionally separated instances, including: a public 5GC instance configured to host the public network realized as a network slice; a private 5GC instance configured to host one or more campus networks, wherein the one or more campus networks are realized as Network Slices; and a data layer instance configured to host Unified Data Repository (UDR) functionality. Unified Data Management (UDM) functions of both 5GC instances are connected to the data layer instance. A Network Slice Selection Function (NSSF) contains the information about network slices present in both 5GC instances.

19 Claims, 5 Drawing Sheets

(56) References Cited

U.S. PATENT DOCUMENTS

| | | | | |
|---|---|---|---|---|
| 2021/0184875 A1* | 6/2021 | Qiao | ................... | H04M 15/66 |
| 2021/0195408 A1* | 6/2021 | Yang | ................... | H04W 48/14 |
| 2021/0385742 A1* | 12/2021 | Liao | ................... | H04W 48/18 |
| 2022/0201556 A1* | 6/2022 | Yang | ................... | H04W 48/18 |
| 2022/0201593 A1* | 6/2022 | Baek | ................... | H04W 60/00 |
| 2022/0337995 A1* | 10/2022 | Baek | ................... | H04W 8/02 |
| 2023/0052947 A1* | 2/2023 | Maguire | ............... | H04W 68/02 |
| 2023/0084683 A1* | 3/2023 | Chun | ................... | H04W 4/90 |
| 2023/0092245 A1* | 3/2023 | Saroiu | ................. | H04W 12/03 |
| | | | | 726/22 |
| 2023/0100843 A1* | 3/2023 | Schliwa-Bertling | ........................ | |
| | | | | H04W 68/02 |
| | | | | 370/329 |

* cited by examiner

NETWORK SLICING BASED CAMPUS NETWORKS

CROSS-REFERENCE TO PRIOR APPLICATIONS

This application claims benefit to European Patent Application No. EP 21 213 695.6, filed on Dec. 10, 2021, which is hereby incorporated by reference herein.

FIELD

The invention relates to network slicing based Campus Network. More particularly, the present invention relates to a 5G network comprising: an Access Network (AN); one or more 5G Core (5GC) network instances; one or more Campus components each configured to run 5GC software associated to a Campus Network; and one or more Public Network components each configured to run 5GC software associated to a Public Network.

BACKGROUND

Campus Networks are a new development within the ecosystem of mobile networks. Until today, mobile networks were typically designed and deployed as public networks that offer services to end customers. These implied large-scale networks shared by a high number of customers, as well as abiding to a broad set of country-specific regulations covering aspects such as services to be offered, universality of services, interconnection with other networks (e.g. roaming), telephony services, emergency services, security requirements (e.g. some countries allow SIM-less communication) and legal interception.

The use of 5G-based technologies enables the opportunity to provide alternative forms of connectivity. This includes the offering of private networks to business customers and address a different set of requirements, often under a different regulatory framework. Such networks are often referred to as Campus Networks and/or non-public networks (NPNs).

GSM Association Official Document NG.123-5G industry Campus Network deployment guideline (available at gsma.com), provides two main implementation options for Campus Networks:
1. Dedicated networks, which are decoupled from any mobile network and are directed to the sole purpose of providing internal connectivity to an isolated set of network subscribers. This is typically referred to as a "private network" and/or "standalone non-public networks (SNPN)".
2. Shared networks, where some or all the components of the Campus Network are shared with a Public Mobile Network. Currently, for these types of Campus Networks, there is no fixed definition of how they are implemented, e.g. which parts of the network are shared with the public mass market network and which are dedicated. Shared network are often also termed "public network integrated non-public networks (PNI-NPN)". A common constrain in PNI-NPNs is that the access network (e.g. RAN) is constrained to using a common PLMN ID.

For Campus Networks of the second type (shared networks), there are two key requirements: efficient operation and isolation.

In order to achieve efficient operation of a potentially large number of Campus Networks, it is advantageous to reduce the operational complexity that each additional Campus Network generates to the network operator.

This is typically achieved by exploiting synergies between the networks, especially with the public mass market network. A common method used would be to reuse the public mass market network components for providing service to one or more Campus Network (e.g. signaling components, repository of subscriber data, user plane components). Another common method used would be the usage of the same software, mechanisms and skills in operation of the Campus Network and the public network (e.g. common component management platform). In other words, the 5GC instances (public and private) are based on the same software and/or are operated via the same administrative tools and systems.

With regard to the second requirement, Campus Networks often have to follow stringent isolation and security principles.

This is typically a requirement from two parties, namely by the customer (the user for the Campus Network) and the operator (in the case of a shared network typically an MNO providing a Campus Network sharing components with the public network).

Customers demand isolation especially for security and reliability reasons and also for data sovereignty (e.g. to retain control of their subscriber data) and privacy reasons (e.g. to avoid eavesdropping of Campus Network traffic by third parties). For example, an attacker who manages to enter one network should not be able to access a second network as well. Furthermore, an outage external to a production facility (e.g. connectivity to shared network components outside of the premises) should not affect the availability of a Campus Network.

From the operator's point of view, isolation is demanded for the same reasons. In addition, isolation also provides the operator with more flexibility in, for example, modifying a Campus Network without constraining and/or conditioning other Campus Networks or the public network.

The two mentioned requirements (efficient operation and isolation) create a trade-off when it comes to the implementation of a Campus Network. Isolation is required for the reasons described, but on the other hand there is the need to create synergies and efficiency of component usage between networks for operational efficiency.

Deployment of virtualized 5G network components on cloud infrastructure and network segmentation of the cloud in different network regions which can be jointly managed allows for flexible deployment of software instances across a network, e.g. to aggregate the deployment of certain components in a "central cloud" region and to deploy "edge regions" of the cloud based on criteria such as geographical proximity.

SUMMARY

In an exemplary embodiment, the present invention provides a 5G network. The 5G network includes an access network (AN), a 5G Core (5GC), one or more campus network components each configured to run 5GC software associated to a campus network, and one or more public network components each configured to run 5GC software associated to a public network. The 5GC comprises a central cloud having functionally separated instances, including: a public 5GC instance configured to host the public network realized as a network slice; a private 5GC instance configured to host one or more campus networks, wherein the one or more campus networks are realized as Network Slices;

and a data layer instance configured to host Unified Data Repository (UDR) functionality. Unified Data Management (UDM) functions of both 5GC instances are connected to the data layer instance. A Network Slice Selection Function (NSSF) of both the public network and the one or more campus networks contains the information about network slices present in both 5GC instances.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
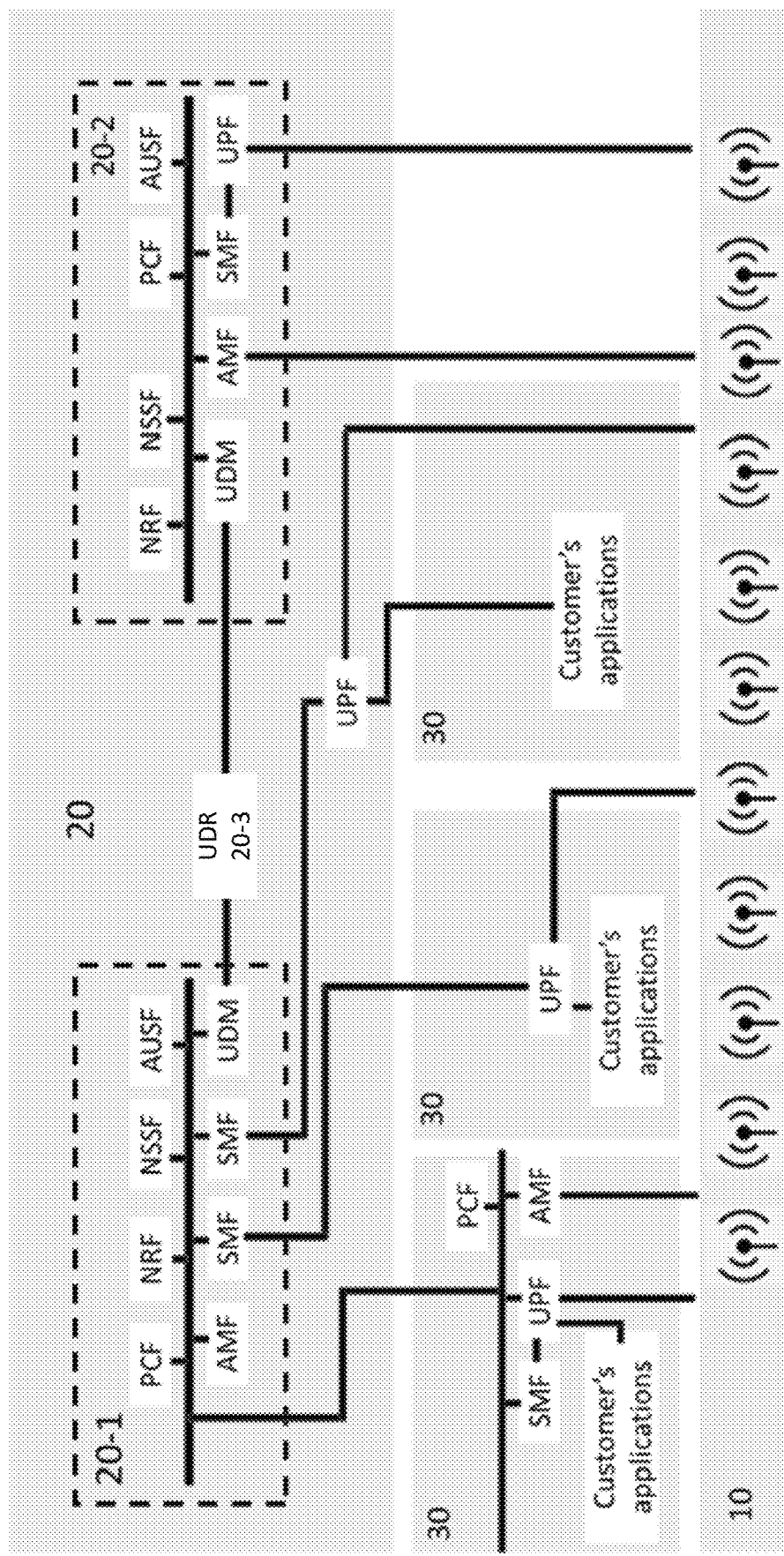
FIG. 1 illustrates the architecture of a 5G network according to an embodiment of the invention.

Exemplary embodiments of the present invention provide a 5G network with a common access network comprising one or more 5G Core (5GC) network instances, capable of providing one or more Campus Networks on and a public network with differentiated services and network isolation while at the same time enabling component reuse between the 5G network instances and an increased operational efficiency.

According to a first embodiment, the invention provides a 5G network comprising: an Access Network (AN); a 5G Core (5GC); one or more Campus Network components each configured to run 5GC software associated to a Campus Network; and one or more Public Network components each configured to run 5GC software associated to a Public Network.

The 5GC comprises a central cloud having functionally separated instances: a public 5GC instance configured to host the public network realized as a Network Slice, a private 5GC instance configured to host one or more Campus Networks, wherein the one or more Campus Networks are realized as Network Slices, and a data layer instance configured to host Unified Data Repository (UDR) functionality.

Further, Unified Data Management (UDM) functions of both 5GC instances are connected to the data layer instance, wherein a Network Slice Selection Function (NSSF) of both the public network and the one or more Campus Networks, contains the information about Network Slices present in both 5GC instances.

In an embodiment, the data layer instance is configured to host a first UDR function connected to the UDM function of the public 5GC instance, and second UDR function connected to the UDM function of the private 5GC instance, wherein data for a specific subscriber and/or a specific policy are stored in both the first and second UDR functions.

In an embodiment, the data layer instance is configured to host a first UDR function connected to the UDM function of the public 5GC instance, and second UDR function connected to the UDM function of the private 5GC instance, wherein the first and second UDR functions are configured to access the same data repository.

In an embodiment, the private 5GC instance is configured to implement one or more Campus Networks as individual Network Slices, wherein a Campus Network has: one or more Network Functions (NFs) in a local cloud infrastructure at a customer's premises, or a User Plane Function (UPF) in a local cloud infrastructure and any remaining Network Functions (NFs) are located in the private 5GC instance, or all Network Functions (NFs) are hosted in the central cloud.

In an embodiment, the NFs are shared between two Network Slices and/or the NFs are dedicated to a single Network Slice.

In an embodiment, the AN is a Radio Access Network (RAN) configured to provide connectivity to the public network and the one or more Campus Networks.

In an embodiment, the RAN is configured to provide guaranteed availability of radio resources to Network Slices of the one or more Campus Networks.

In an embodiment, the RAN comprises dedicated cells within a dedicated spectrum, which are only available to one or more User Equipment (UEs) that are part of a corresponding Campus Network, identified via Single-Network Slice Selection Assistance Information (S-NSSAI).

In an embodiment, the RAN comprises a single cell across the public network and dedicated spectrum, wherein the one or more Campus Networks have an assigned part of the dedicated spectrum within the single cell.

In an embodiment, the RAN comprises cells configured with a Closed Access Group Identifier (CAG ID) and one or more UEs configured with a CAG ID, wherein the RAN is configured to allow access to the 5G Network via a cell configured with a given CAG ID only to the UEs configured with the given CAG ID.

In an embodiment, the public network is realized as one or multiple Network Slices.

In an embodiment, one or more Campus Networks each include multiple Network Slices.

In an embodiment, the one or more Campus Networks is configured to: use one Network Slice for Ultra-Reliable and Low-Latency Communication (URLLC) as part of the Campus Network; and use a second Network Slice for any other communication within the Campus Network.

In an embodiment, the public 5GC instance and the private 5GC instance are based on the same software and/or are operated via the same administrative tools and systems.

Other aspects, features, and advantages will be apparent from the summary above, as well as from the description that follows, including the figures and the claims.

FIG. 1 shows the architecture of a 5G network 1, including the 5G Core (5GC) 20 which comprises the 5GC network instances 20-1 and 20-2 which are used to implement Campus Networks 30 as part of the invention. In detail, the 5G network 1 comprises: an Access Network 10 (AN), one or more 5G Core (5GC) instances, one or more local Campus Network components each configured to run 5GC software associated to a Campus Network, and one or more local Public Network components each configured to run 5GC software associated to a Public Network.

The 5G network 1 comprises a cloud infrastructure comprised of one or more cloud locations: a central cloud and/or one or more local clouds. The different cloud locations contain functionally separated instances of network components. These are used to host both the public mass market network as well as multiple Campus Networks.

The central cloud infrastructure hosts 5GC components used for the public network as well as for one or more Campus Networks. To achieve isolation, two separate instances 20-1 and 20-2 of a 5GC are created on a common central cloud infrastructure. One 5GC network instance, further referred to as public 5GC instance 20-2, is used to host the public network ("Public 5GC" in the figure, fenced by a dashed line), and another 5GC network instance, further referred to as private 5GC instance 20-1, is used to host one or more Campus Networks 30 ("Private 5GC" in the figure, fenced by a dashed line).

The Access Network 10 (AN) provides connectivity between the 5GC 20 and the UEs via one or more Public Land Mobile Network identities (PLMN IDs). It should be noted that the concept can be generalized to any kind of Access Networks.

In an embodiment, Network Slicing is used to realize multiple logical networks based on the deployment described above. This means in detail that one or more Network Slices are created to realize public network services (as part of the Public 5GC). Further, multiple network slices are created to implement Campus Networks 30, wherein one Campus Network 30 can be either represented by a single or multiple network slices. Still further, within the private 5GC instance 20-1, Network Function (NFs) instances can be either shared by Network Slices or there can be NFs dedicated to a certain single network slice. It is up to the detailed implementation which NFs to share and which are dedicated.

Figure 2:
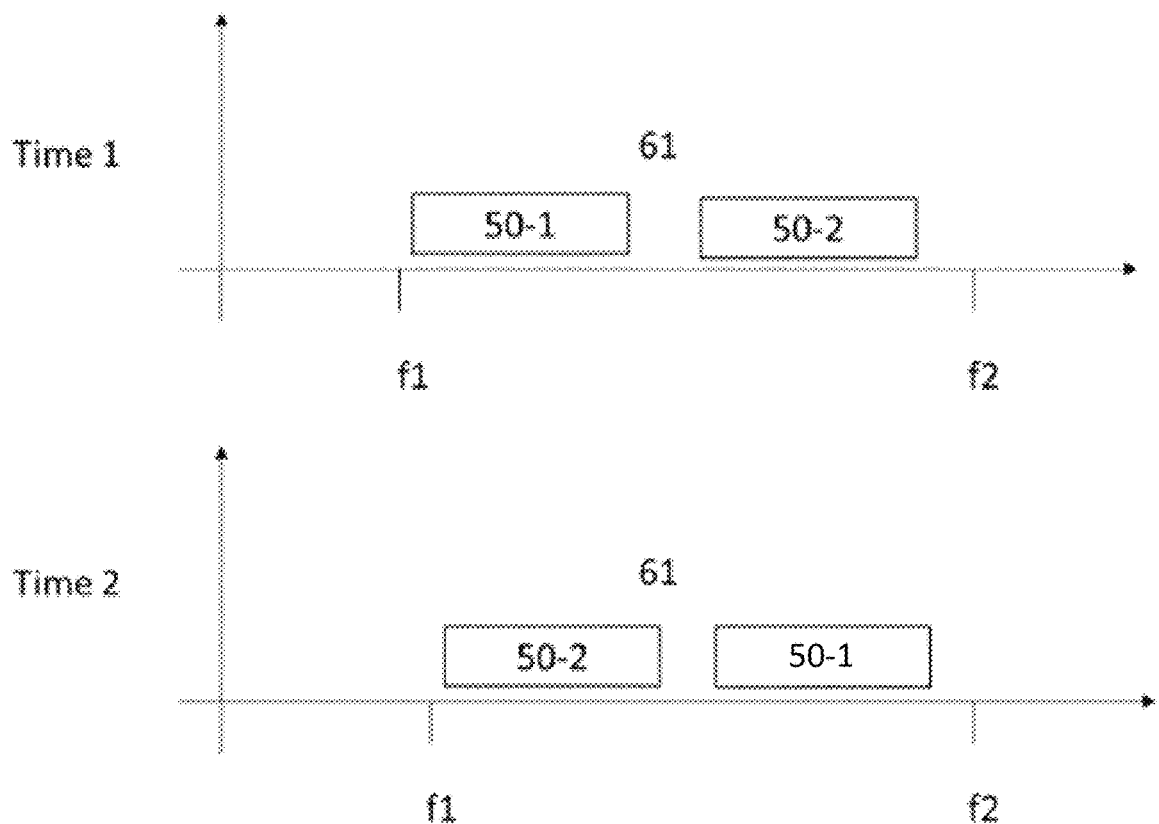
FIG. 2 illustrates an exemplary Network Slice, such as a Campus Network, being provided with a guaranteed availability of radio resources.
Figure 3:
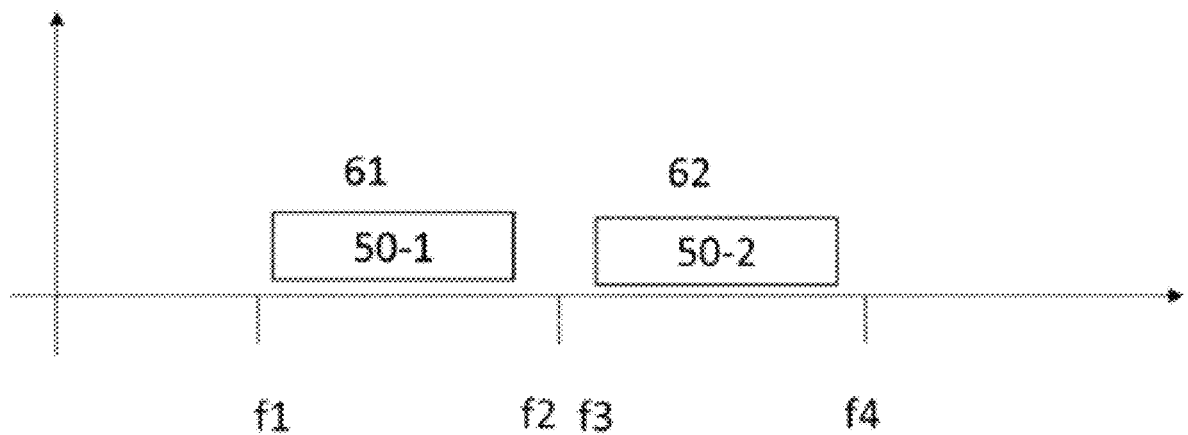
FIG. 3 illustrates a RAN associating users of a Network Slice with a correct spectrum via dedicated cells within in a dedicated spectrum.
Figure 4:
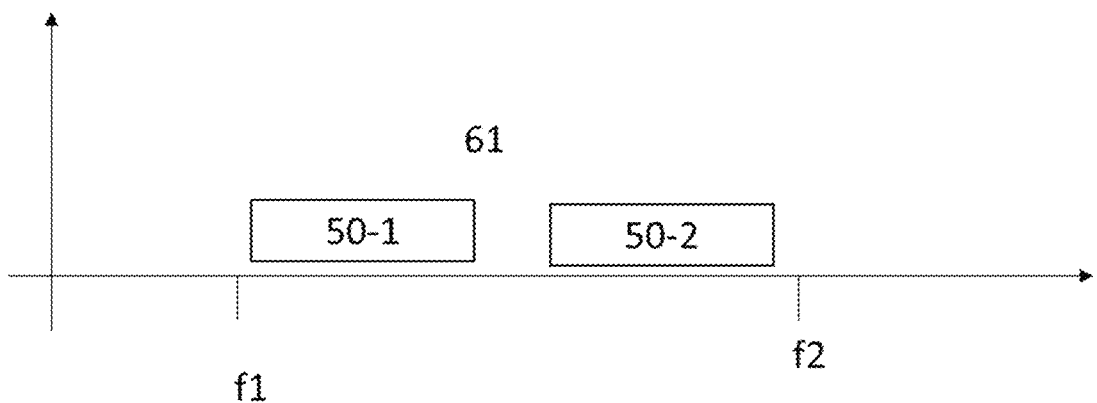
FIG. 4 illustrates a RAN associating users of a Network Slice with a correct spectrum via a single cell across a public network and a dedicated spectrum.

In an embodiment, the 5G Access Node 10 (AN) is shared among all the Network Slices (public network as well as Campus Networks). In this description, a Radio Access Network 10 (RAN) is exemplarily used. A 5G RAN is composed of gNBs, each providing one or more cells 61, 62 over one or more frequencies (FIGS. 2, 3 and 4 show frequencies f1, f2, f3, f4 to illustrate different examples).

According to the present invention, the RAN 10 uses the following functionality to realize isolation on radio level.

In order to provide radio resource isolation, based on a functionality in the scheduler of the RAN, a Network Slice, especially a Campus Network, can be provided with a guaranteed availability of radio resources. In this case, as shown in FIG. 2, radio resources can dynamically be assigned over time to the UEs 50-1 and 50-2. However, there is a certain number of radio resources which are guaranteed to be assigned to a Network Slice.

Alternatively, Network Slicing based association of User Equipment (UEs) to spectrum can be provided. Campus Networks are often used with dedicated spectrum (e.g. the so-called Industry Spectrum in Germany), which can only be used for that purpose and not for public mass market services. By way of an example, in the present invention, the expression "dedicated spectrum" may refer to spectrum dedicated to industry use, but it is not limited to that use.

Based on a functionality in the RAN, the RAN associates users of a Network Slice with the correct spectrum.

This can happen via dedicated cells within in the dedicated spectrum, which are only available to UEs that are part of the corresponding Campus Network (identified via the Network Slice ID—the so-called Single—Network Slice Selection Assistance Information (S-NSSAI)). This case is depicted in FIG. 3, where UE 50-2 is an example for UE that is provided with dedicated spectrum (band f3-f4) via a dedicated cell (cell 62) in dedicated spectrum. UE 50-1 is part of the public network (cell 61) and cannot access cell 62.

Furthermore, there can also be a single cell 61 across the public network and the dedicated spectrum (e.g. in the case of contiguous frequencies). FIG. 4 shows an example where a single cell 61 is used across the public network and the dedicated spectrum. In this case, campus networks have an assigned part of the dedicated spectrum within the single cell. This means that UEs are only provided with radio resources that are in the spectrum corresponding to the S-NSSAI associated with the UE.

In addition, these dedicated cells can be protected via the Closed Access Group (CAG) feature. In particular, the RAN may comprise cells configured with a Closed Access Group Identifier, (CAG ID) and one or more UEs configured with a CAG ID. Accordingly, the RAN, may control and allow access to the 5G Network via a cell configured with a given CAG ID only to the UEs configured with the given CAG ID.

The present invention does not limit the usage of Network Slices also for additional purposes, such as, for example, multiple Network Slices can exist in the public network, e.g. for special services requiring lower latency.

In a further example, a Campus Network can also include multiple Network Slices, such as, for example, one Network Slice for Ultra-Reliable and Low-Latency Communication (URLLC) as part of the Campus Network and a second Network Slice for any other communication within the Campus Network.

The two 5GC network instances (private and public 5GC instances) are functionally separated. The only coupling between them is described below. The reasons for this level of coupling is related with the UPU procedure as described above.

Figure 5:
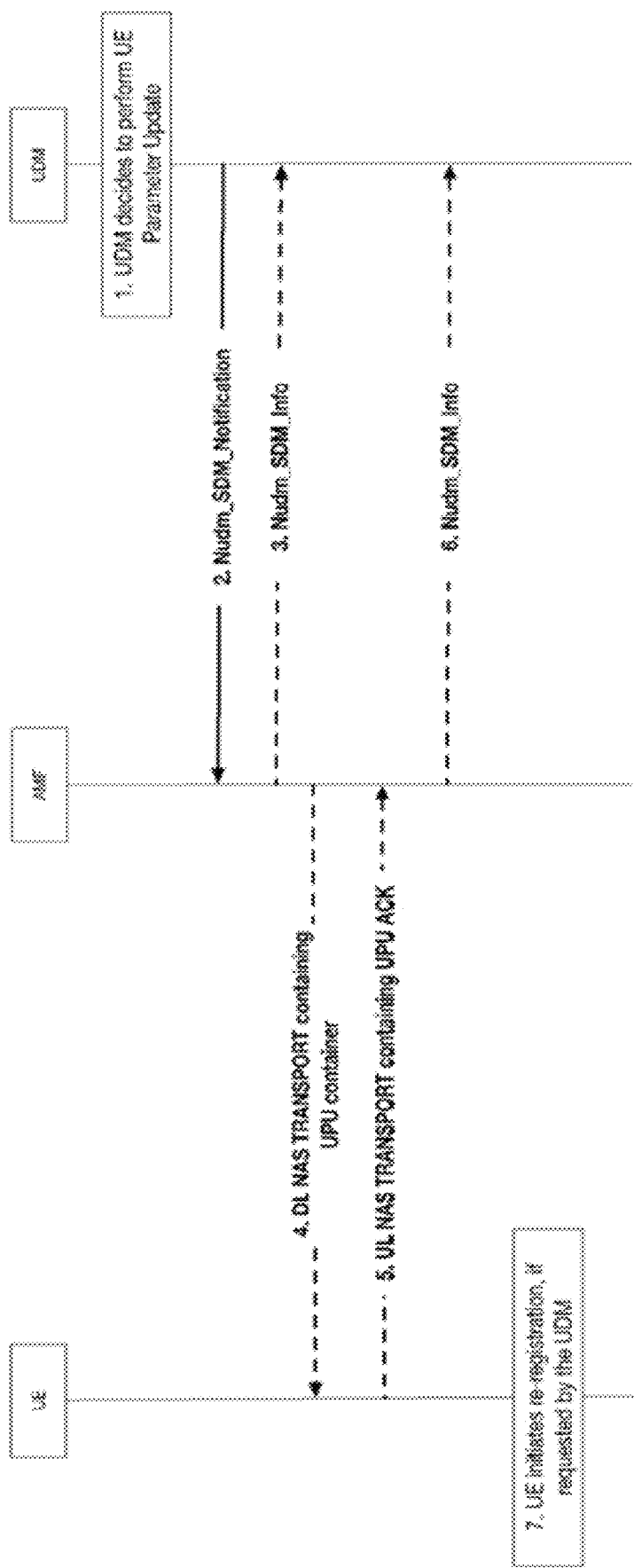
FIG. 5 illustrates a sequence diagram of a UE Parameters Update via a UDM Control Plane Procedure as provided in TS 23.502 clause 4.20.2.

In an embodiment, the provisioning of an S-NSSAI to a new UE is performed after network registration via the UE Parameter Update (UPU) procedure (can be also pre-provisioned in the UE earlier). The procedure is defined in TS 23.502, clause 4.20.2 and TS 33.501, clause 6.15. FIG. 5 illustrates a sequence diagram of the UE Parameters Update via UDM Control Plane Procedure as provided in TS 23.502 clause 4.20.2. The UDM may decide to perform UE parameters update anytime after the UE has been successfully authenticated and registered to the 5G system.

Figure 6:
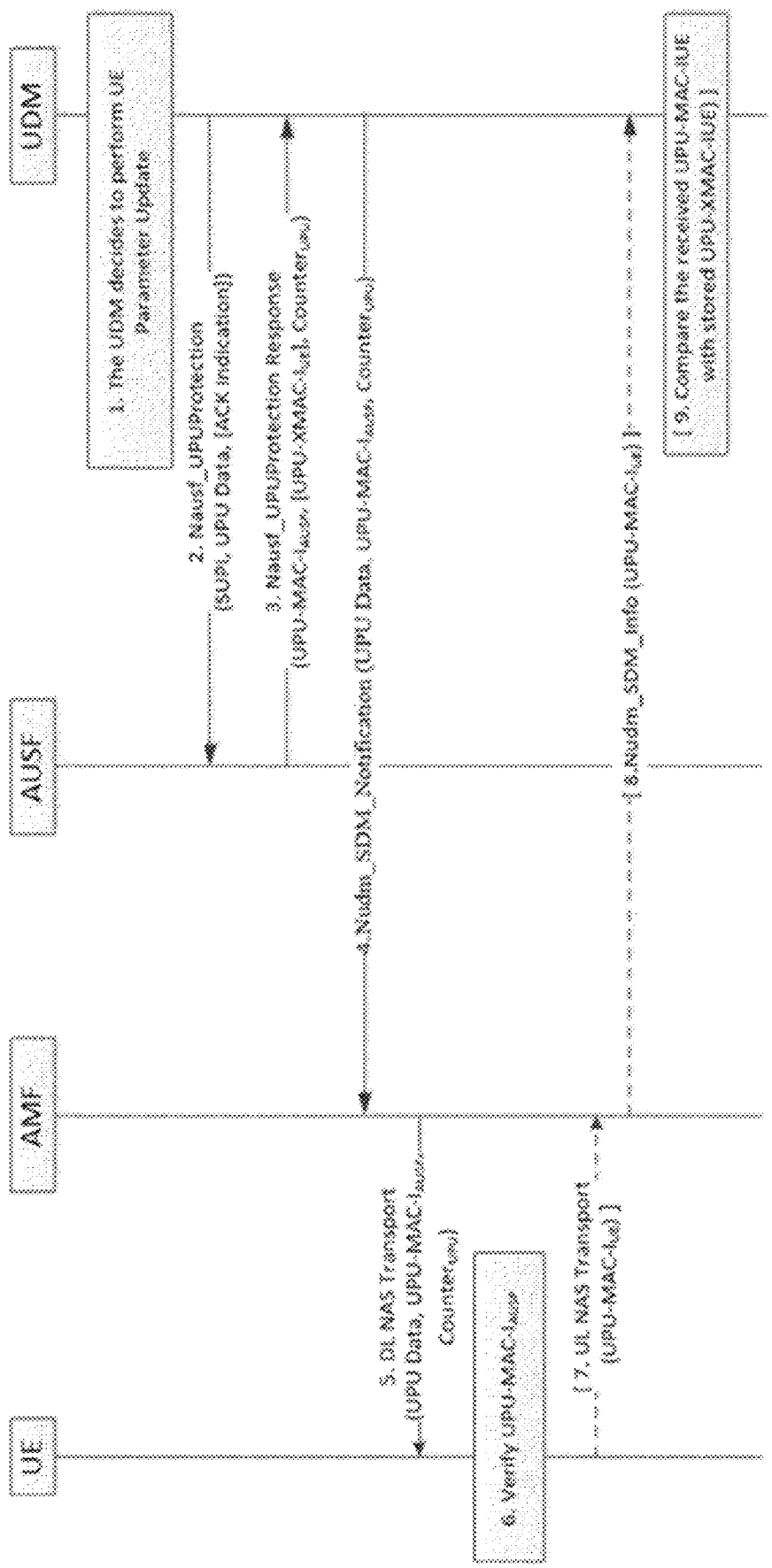
FIG. 6 illustrates a sequence diagram of a procedure for a UE parameters update as provided in TS33.501 clause 6.15.

The UPU message received by the UE is verified as described in TS 33.501, clause 6.15. FIG. 6 illustrates a sequence diagram of the procedure for UE parameters update as provided in TS33.501 clause 6.15.

Given that the information transmitted to the UE provisions critical information in the UE, it is not foreseen that no security mechanism is used.

The Authentication Server Function (AUSF) provides the APIs (i.e. NF Services) necessary for generating the information added to the UPU that the UE requires to validate the message (UPU-MAC), as well as for authenticating a UE.

In an embodiment, the UPU protection AUSF NF service functionality is placed in the Central Cloud. The provisioning of the S-NSSAI is a procedure commonly foreseen for onboarding of new UE, where the slice information may not be present in the UE. In this sense, it is typically a once-in-UE-lifetime procedure.

In more detail, the provisioning procedure involves the following elements.

First, the unprovisioned UE connects to the RAN 10. Since the UE is not providing an S-NSSAI to the RAN 10, it is not known which 5GC instance (specifically which AMF) should provide service to the UE.

Therefore the RAN 10 selects a default AMF, e.g. the AMF the public 5GC instance 20-2 for a first attach.

Afterwards, the UE is provided with the correct S-NSSAI using the UPU procedure described above. For this, the UDM has access to the corresponding subscriber data as well as that the NSSF is aware of the corresponding Network Slices. According to the invention this is achieved via the Unified Data Management (UDM) functions of both instances (public 5GC instance 20-2, private 5GC instance 20-1), which are connected to the same Unified Data Repository (UDR) 20-3. The UDR 20-3 is responsible for storing subscriber and policy data and can either comprise said storage (e.g. a database, commonly referred to as data layer and/or data repository) or rely on a separated data layer. In other words, the Unified Data Management, UDM, functions of both 5GC instances 20-1 and 20-2 are connected to a data layer providing access to Unified Data Repository (UDR) functionality.

Alternatively, the above configuration may be implemented as a data layer instance that provides a first UDR function connected to the UDM function of the public 5GC instance, and second UDR function connected to the UDM function of the private 5GC instance. In this case, the data for a specific subscriber and/or a specific policy are stored in both the first and second UDR functions.

Still in another alternative implementation, the data layer instance may provide a first UDR function connected to the UDM function of the public 5GC instance, and second UDR function connected to the UDM function of the private 5GC instance, wherein the first and second UDR functions are configured to access the same data repository.

In the above implementations, the Network Slice Selection Function (NSSF) of both instances contain the same information about the Network Slices present in both 5GC instances.

After the UPU, the UE re-attaches to the RAN and is now able to provide an S-NSSAI. Based on this, the RAN can select the correct AMF.

Placing such a functionality in the Central Cloud is advantageous and reduces the complexity of the campus local deployment. Non-availability of this functionality in the Central Cloud would only impact provisioning of new UEs and not the availability of the Campus Network per se.

Using the private 5GC, a high number of Campus Networks can be implemented as individual Network Slices. For example, the Campus Networks may be of the following types:

"Campus local": As indicated by the FIG. 1 middle left box. Here most NFs are deployed in a local cloud infrastructure at the customer's premises. This type of a Campus Network targets customers requiring processing of all data locally as well as resiliency. It is noted that it can still operate in a limited manner in case connectivity to the private 5GC is interrupted.

"Campus local UPF": As indicated by indicated by the FIG. 1 middle second left box. Here only the User Plane Function (UPF) is deployed in a local cloud infrastructure, whereas the remaining NFs are hosted in the private 5GC. This has advantages compared to Campus local in terms of a central operation of NFs, but also the disadvantage of lower resiliency against disruption of the connectivity to the private 5GC.

"Campus central": As indicated by indicated by the FIG. 1 middle right box. All NFs are hosted centrally, making operations most efficient. However ultra-low latency service may not be offered in this type of network and a disruption in the connectivity toward the RAN causes an immediate outage of the network.

In addition, the NFs within the Private 5GC may be NFs that are shared between multiple Network Slices and/or NFs that are dedicated to a single Network Slice.

As mentioned above, the present invention overcomes the challenge of a trade-off between operational efficiency and isolation.

In view of the above, the present invention achieves the isolation by isolating the dedicated network instances (Campus Networks) from the public network via Network Slicing and/or PLMN ID. The only network function that is shared is the Unified Data Repository (UDR). Furthermore, individual Campus Networks are isolated via Network Slicing. In this regard, the invention makes use of the isolation mechanism provided by Network Slicing (e.g. dedicated NFs).

Still further, in view of the above, the present invention achieves the realization of synergies between Public Network and Campus Networks by using the same software for both the public network and Campus Networks, which enables the same or similar operations skills for operations teams. Furthermore, the public network and Campus Networks share a common Central Cloud infrastructure with a single operation and pooling gains. Still further, the RAN is shared among the Public Network and the Campus Networks. Accordingly, the same tools, especially in terms of automation and orchestration, can be used for the Public Network and the Campus Networks.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A virtualized 5G network comprising:
   an access network (AN);
   one or more campus network components each configured to run 5G Core (5GC) software associated to a respective campus network;
   one or more public network components each configured to run 5GC software associated to a public network;
   a Network Slice Selection Function (NSSF) component for the public network and for one or more campus networks, wherein the NSSF component contains information about network slices present in a public 5GC instance and a private 5GC instance; and
   a 5GC, comprising a central cloud having functionally separated instances, including:
     the public 5GC instance, wherein the public 5GC instance is configured to host the public network realized as one or more network slices; and
     the private 5GC instance, wherein the private 5GC instance is configured to host the one or more campus networks, wherein the one or more campus networks are realized as one or more network slices;
   wherein the 5GC is configured to host Unified Data Repository (UDR) functionality connected to Unified Data Management (UDM) functions of both 5GC instances.

2. The 5G network of claim 1, wherein the 5GC is configured to host a first UDR function connected to the UDM function of the public 5GC instance and a second UDR function connected to the UDM function of the private 5GC instance, wherein data for a specific subscriber and/or a specific policy are stored in both the first and second UDR functions.

3. The 5G network of claim 1, wherein the 5GC is configured to host a first UDR function connected to the UDM function of the public 5GC instance and a second UDR function connected to the UDM function of the private 5GC instance, wherein the first and second UDR functions are configured to access the same data repository.

4. The 5G network of claim 1, wherein the private 5GC instance is configured to implement the one or more campus networks as one or more respective individual network slices, wherein a respective campus network has one or more network functions (NFs) in a local cloud infrastructure at a customer's premises.

5. The 5G network of claim 1, wherein the private 5GC instance is configured to implement the one or more campus networks as one or more respective individual network slices, wherein a respective campus network has a User Plane Function (UPF) in a local cloud infrastructure and any remaining network functions (NFs) are located in the private 5GC instance.

6. The 5G network of claim 1, wherein the private 5GC instance is configured to implement the one or more campus networks as one or more respective individual network slices, wherein a campus network has all network functions (NFs) hosted in the central cloud.

7. The 5G network of claim 6, wherein the NFs are shared between two network slices.

8. The 5G network of claim 6, wherein the NFs are dedicated to a single network slice.

9. The 5G network of claim 1, wherein the AN is a Radio Access Network (RAN) configured to provide connectivity to the public network and the one or more campus networks.

10. The 5G network of claim 9, wherein the RAN is configured to provide guaranteed availability of radio resources to the one or more campus networks realized as the one or more network slices.

11. The 5G network of claim 9, wherein the RAN comprises dedicated cells within a dedicated spectrum which are only available to one or more user equipments (UEs) that are part of a corresponding campus network identified via Single-Network Slice Selection Assistance Information (S-NSSAI).

12. The 5G network of claim 9, wherein the RAN comprises a single cell across the public network and a dedicated spectrum, wherein the one or more campus networks have an assigned part of the dedicated spectrum within the single cell.

13. The 5G network of claim 9, wherein the RAN comprises cells configured with a Closed Access Group Identifier (CAG ID) and one or more UEs configured with a CAG ID;
    wherein the RAN is configured to allow access to the 5G network via a cell configured with a given CAG ID only to UEs configured with the given CAG ID.

14. The 5G network of claim 1, wherein the public network is realized as a single network slice.

15. The 5G network of claim 1, wherein a respective campus network includes multiple network slices.

16. The 5G network of claim 1, wherein a respective campus network is configured to:
    use one network slice for Ultra-Reliable and Low-Latency Communication (URLLC) as part of the respective campus network; and
    use a second network slice for any other communication within the respective campus network.

17. The 5G network of claim 1, wherein the public 5GC instance and the private 5GC instance are based on the same software.

18. The 5G network of claim 1, wherein the public 5GC instance and the private 5GC instance are operated via the same administrative tools and systems.

19. The 5G network of claim 1, wherein the public 5GC instance and the private 5GC instance are based on the same software and are operated via the same administrative tools and systems.

* * * * *